(12) United States Patent
Andrew

(10) Patent No.: US 6,563,958 B1
(45) Date of Patent: May 13, 2003

(54) METHOD AND APPARATUS FOR BOUNDARY FILTERING A DIGITAL IMAGE

(75) Inventor: James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/344,114

(22) Filed: Jun. 24, 1999

(30) Foreign Application Priority Data

Jul. 2, 1998 (AU) .............................................. PP4448

(51) Int. Cl.[7] .............................. G06T 5/00; G06K 9/40; H04N 1/409; H04N 5/21
(52) U.S. Cl. ................................... 382/268; 375/240.27
(58) Field of Search ................................ 382/268, 260, 382/261, 275; 375/240.26, 240.27, 240.29

(56) References Cited

U.S. PATENT DOCUMENTS

| 5,337,088 A | | 8/1994 | Honjo .................... 375/240.24 |
| 5,796,875 A | * | 8/1998 | Read .......................... 382/268 |
| 5,852,681 A | * | 12/1998 | Amaratunga et al. ........ 382/268 |
| 5,974,196 A | * | 10/1999 | Chang et al. ................ 382/268 |
| 6,041,145 A | * | 3/2000 | Hayashi et al. ............. 382/268 |
| 6,317,522 B1 | * | 11/2001 | Rackett ....................... 382/268 |

FOREIGN PATENT DOCUMENTS

| JP | 9-93580 | * 4/1997 | ............ H04N/7/30 |
| WO | WO96/33474 | 10/1996 | ............. G06T/9/00 |
| WO | WO98/41025 | 9/1998 | ............ H04N/7/30 |
| WO | WO99/42954 | 8/1999 | ............. G06T/9/00 |

OTHER PUBLICATIONS

"Blocking Effect Reduction of JPEG Images By Signal Adaptive Filtering", Y.L. Lee et al, IEEE Transactions On Image Processing, vol. 7, No. 2, Feb. 1998, pp. 229–234.

* cited by examiner

*Primary Examiner*—Scott Rogers
(74) *Attorney, Agent, or Firm*—Fitzpatrick, Cella, Harper & Scinto (57) ABSTRACT

The method decompresses blocks of a compressed image (202,204,206,208) and boundary filters the blocks (210). The method one-dimensionally filters across those boundary regions having a common boundary in accordance with a predetermined formulae, wherein the one-dimensional filtering is applied perpendicular to the common boundary.

40 Claims, 5 Drawing Sheets

Fig 6

METHOD AND APPARATUS FOR BOUNDARY FILTERING A DIGITAL IMAGE

FIELD OF INVENTION

The present invention relates to a method and apparatus for boundary filtering a digital image. The invention also relates to a computer program product including a computer readable medium having recorded thereon a computer program for boundary filtering a digital image.

BACKGROUND OF INVENTION

The publication IEEE Transactions on Image Processing, Vol. 7, No. 2, February 1998, "Blocking Effect Reduction of JPEG Images by Signal Adaptive Filtering" by Y. C. Lee, H. C. Kim, and H. W. Park, discloses a blocking effect reducing algorithm for JPEG decompressed images. This algorithm uses a signal adaptive filtering as well as a corner outlier detection and replacement scheme. A "corner outlier" is a term used by Lee et al to describe a blocking artifact at corner pixels. The signal adaptive filtering is based on the edge information, which is generated by a gradient operation and by an adaptive threshold scheme. The signal adaptive filtering consists of one-dimensional (1-D) smoothing filtering for the edge area and a two-dimensional (2-D) adaptive average filter for the monotone area. A noticeable corner outlier is smoothed by a corner outlier detection and replacement scheme. However such a scheme suffers from the disadvantage in that it is computationally intensive, requires extra buffering and many memory read/write accesses.

There are a number of other image compression methods, which offer better rate-distortion performance than JPEG. One such method is a discrete wavelet transform (DWT) scheme. Traditionally this scheme has been applied to the whole image. However, for certain applications it is desirable to tile the image and independently encode each tile or block of the image with the DWT. Normally, the blocks in such a scheme are much greater in size than the blocks in JPEG, to facilitate better rate-distortion performance. However, these image compression methods also suffer from blocking artifacts at high compression ratios.

ASPECTS OF THE INVENTION

It is an object of the present invention to ameliorate one or more disadvantages of the prior art.

One or more exemplary aspects of the invention are listed below, but are not limited thereto.

According to one aspect of the invention there is provided a method for boundary filtering a digital image, wherein the digital image includes a plurality of adjacent decompressed blocks having one or more boundaries therebetween, which blocks each include a plurality of rows and columns of pixels x[i], and the rows and/or columns of the pixels disposed on opposite sides of the boundaries each include a first line of pixels x[−n], . . . x[−1] and a second line of pixels x[0] . . . x[m] respectively, wherein the pixels x[−1] and x[0] are endpoints of the first and second pixel lines and are adjacently disposed, and wherein the method includes performing the following steps for each of said first and second lines;

(i) determining a plurality of weighted sums of at least the difference between the values of the pixels x[−1] and x[0]; and (ii) replacing, for each pixel x[i], the pixel value of x[i] with the sum of the pixel value of x[i] and a respective said weighted sum, where i=−n, . . . ,m; and wherein m+n is less than the number of rows in the block and/or is less than the number of columns in the block.

According to another aspect of the invention there is provided an apparatus for boundary filtering a digital image, wherein the digital image includes a plurality of adjacent decompressed blocks having one or more boundaries therebetween, which blocks each include a plurality of rows and columns of pixels x[i], and the rows and/or columns of the pixels disposed on opposite sides of the boundaries each include a first line of pixels x[−n], . . . x[−1] and a second line of pixels x[0] . . . x[m] respectively, wherein the pixels x[−1] and x[0] are endpoints of the first and second pixel lines and are adjacently disposed, and wherein the apparatus includes;

means for determining a plurality of weighted sums of at least the difference between the values of the pixels x[−1] and x[0]; and means for replacing, for each pixel x[i], the pixel value of x[i] with the sum of the pixel value of x[i] and a respective said weighted sum, where i=−n, . . . ,m; and wherein m+n is less than the number of rows in the block and/or is less than the number of columns in the block.

According to another aspect of the invention there is provided a computer program product including a computer readable medium having recorded thereon a computer program for boundary filtering a digital image, wherein the digital image includes a plurality of adjacent decompressed blocks having one or more boundaries therebetween, which blocks each include a plurality of rows and columns of pixels x[i], and the rows and/or columns of the pixels disposed on opposite sides of the boundaries each include a first line of pixels x[−n], . . . x[−1] and a second line of pixels x[0] . . . x[m] respectively, wherein the pixels x[−1] and x[0] are endpoints of the first and second pixel lines and are adjacently disposed, said computer program product including:

means for determining a plurality of weighted sums of at least the difference between the values of the pixels x[−1] and x[0]; and means for replacing, for each pixel x[i], the pixel value of x[i] with the sum of the pixel value of x[i] and a respective said weighted sum, where i=−n, . . . ,m; and wherein m+n is less than the number of rows in the block and/or is less than the number of columns in the block.

BRIEF DESCRIPTION OF THE DRAWINGS

Embodiments of the invention are described with reference to the drawings, in which.

DETAILED DESCRIPTION

Where reference is made in any one or more of the accompanying drawings to steps and/or features, which have the same reference numerals, those steps and/or features are the same and have for the purposes of this description the same function(s) or operation(s), unless the contrary intention appears.

Prior Art Method of Compressing a Digital Image

Figure 1:
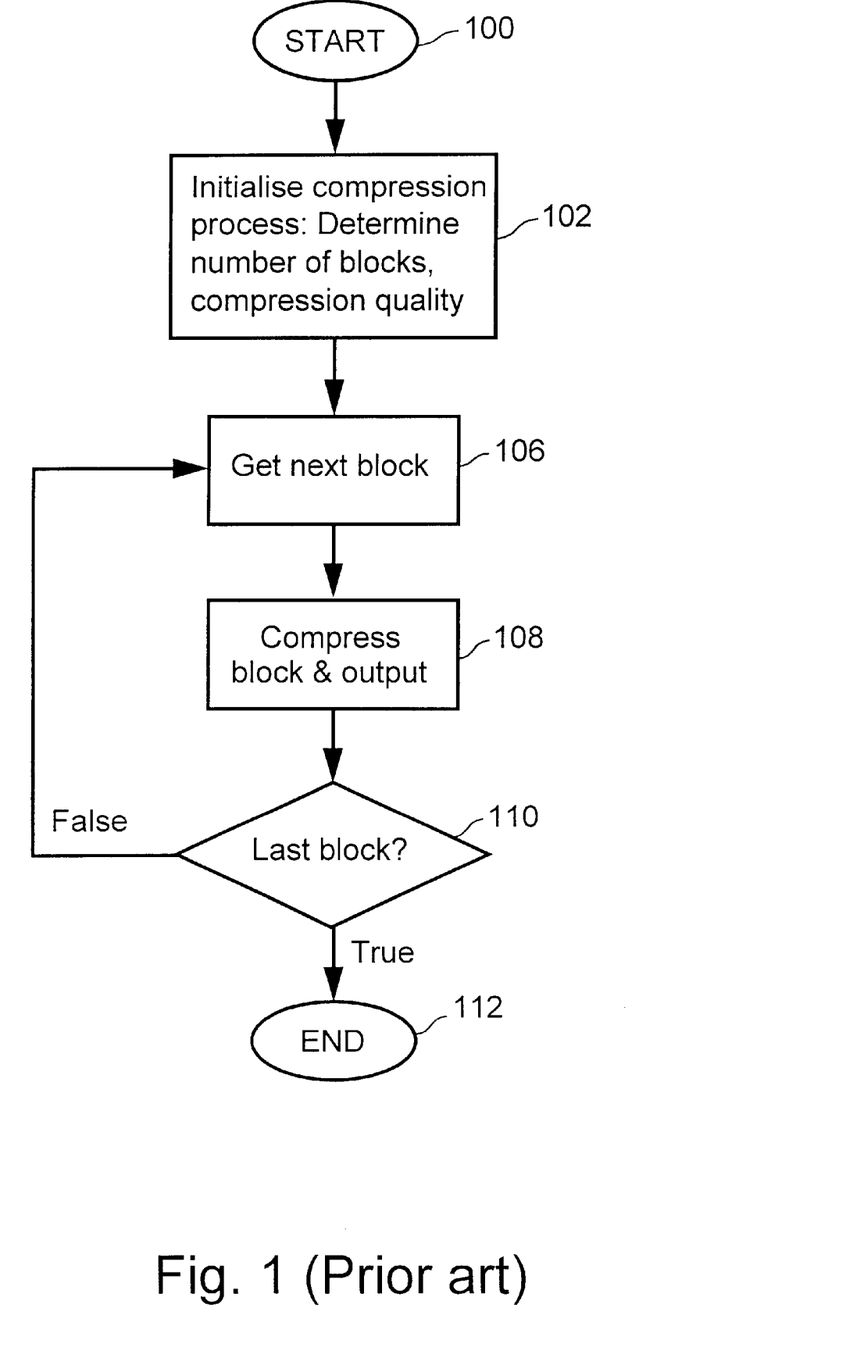
FIG. 1 illustrates a flow diagram of a typical method of compressing a digital image.

FIG. 1 illustrates a flow diagram of a typical method of compressing a digital image. In step 100, the digital image is input and the processing commences. In the next step 102, the compression process is initialized. During this step, the number of image blocks, into which the digital image is intended to be conceptually decomposed, is determined. The compression quality, i.e. quantisation factor, is also determined during the initialization step 102. These latter parameters may be determined by user input or be predetermined. In step 106, the first image block is accessed. In step 108, this first image block is then compressed and the processing continues at decision box 110. The compression step may involve any compression method, which involves independent block coding. These compression methods can be based on discrete wavelet transforms (DWT), or subband transforms, in general. In decision box 110, a check is made to determine whether or not the presently accessed image block is the last image block of the digital image. If the decision block 110 returns false, the next image block is accessed in step 106 and the processing continues at the compression step 108. In this way the image blocks are compressed in sequential order. Information may also be coded into the compressed image header, or elsewhere, to indicate various attributes of the image blocks, including the location of the image block in a compressed bit stream output. If the decision block 110 returns true, the compressed bit stream is output and processing terminates at step 112.

Preferred Embodiment(s) of Method of Decompressing a Digital Image

Figure 2:
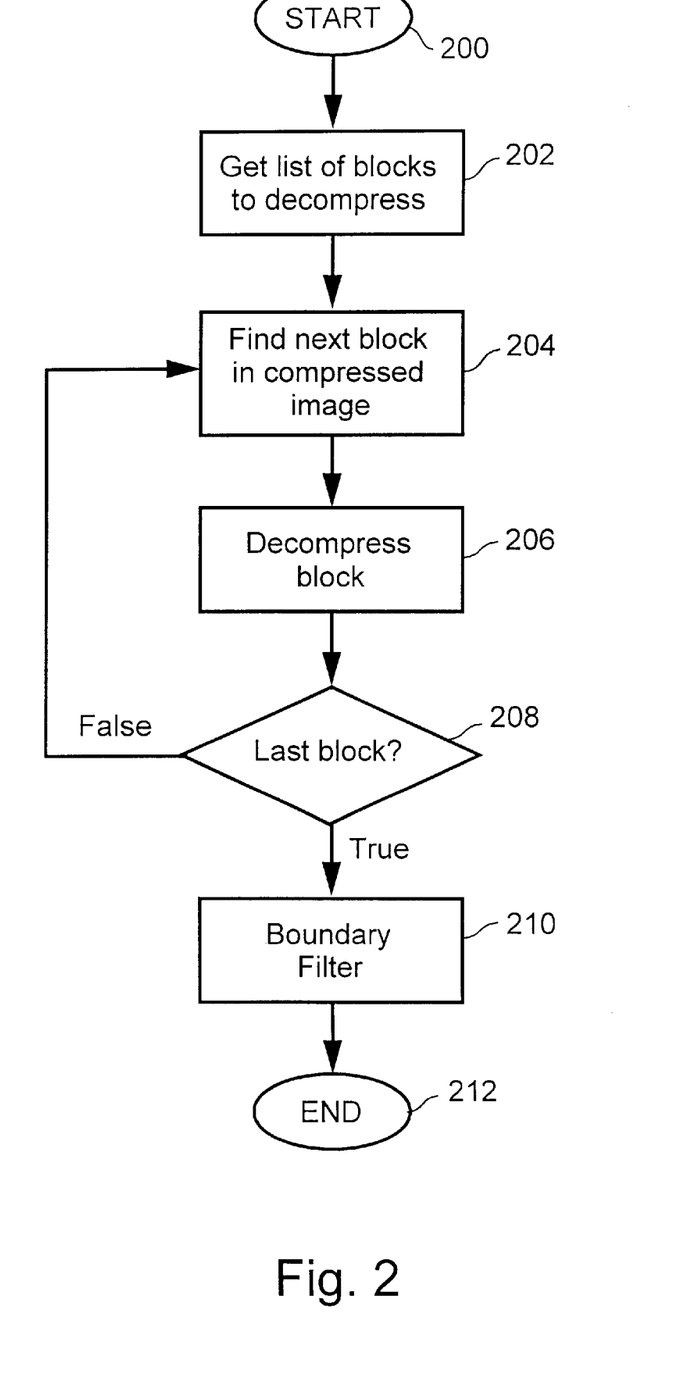
FIG. 2 illustrates a flow diagram of a method of decompressing a compressed digital image in accordance with a preferred embodiment of the invention.

FIG. 2 illustrates a flow diagram of a method of decompressing a compressed digital image in accordance with a preferred embodiment of the invention. The decompression method shown in FIG. 2 is adapted to decompress a digital image that has been compressed in accordance with the method of FIG. 1. In step 200, the compressed digital image is input and the processing commences. In the next step 202, a user specifies a list of the compressed image blocks of the digital image, desired to be decoded. For instance, the user may desire to decode only the right half of the digital image. Alternatively, the step 202 may automatically specify a default list of compressed image blocks to be decoded. In the next step 204, an initial image block is accessed from a bit stream of compressed image data. In step 206, the initial image block is decompressed and the processing continues at decision box 208. In this particular embodiment, the decompression method used in step 206 is substantially the complement of the compression method used in step 108 of FIG. 1. In decision box 208, a check is made to determine whether or not the presently accessed image block is the last image block of the selected list. If the decision block 208 returns false, the next image block is accessed in step 204 and the processing continues at the compression step 206. In this way, the selected list of image blocks is processed in sequential order. If the decision block 110 returns true, the processing continues at step 210. In step 210, the image blocks of the digital image undergo boundary filtering. The step of boundary filtering is described in more detail in the section herein entitled "Preferred Embodiment(s) of Boundary Filtering". In the last step 212, the decompressed selected list of image blocks is output to an output device, typically a screen, and the processing terminates.

Preferred Embodiment(s) of Boundary Filtering

Figure 4:
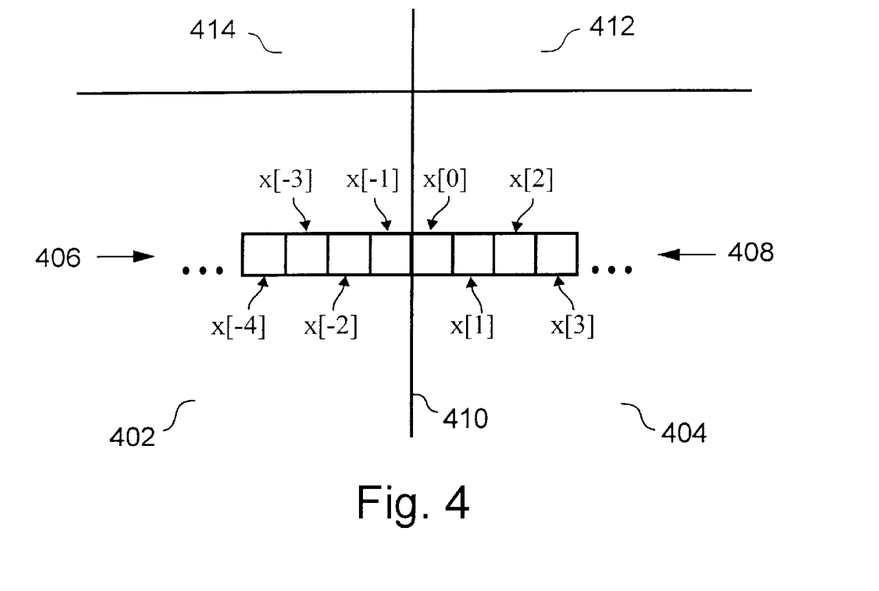
FIG. 4 shows a portion of adjacent decompressed image blocks of a digital image having a number of such image blocks.

FIG. 4 shows a portion of four adjacent square image blocks 402,404,412 and 414 of a digital image having a number of such image blocks. These image blocks 402,404, 412 and 414 are decompressed image blocks, which have undergone a compression and decompression process according to FIGS. 1 and 2. The square image blocks 402,404,412 and 414 include rows and columns of pixels of which a portion of two rows 406 and 408 are shown. The image blocks 402 and 404 are conceptually separated by a boundary 410. The row of pixels 406 includes a series of pixels designated x[−n], . . . , x[−2], x[−1] commencing at the boundary 410 and extending therefrom. The row of pixels 408 include a series of pixels x[0],x[1],x[2], . . . ,x[m] commencing at the boundary and extending therefrom. The endpoints of the pixel rows 408 and 406, which are designated x[0] and x[−1] respectively, are disposed adjacent to each other on opposite sides of the boundary 410.

Figure 5:
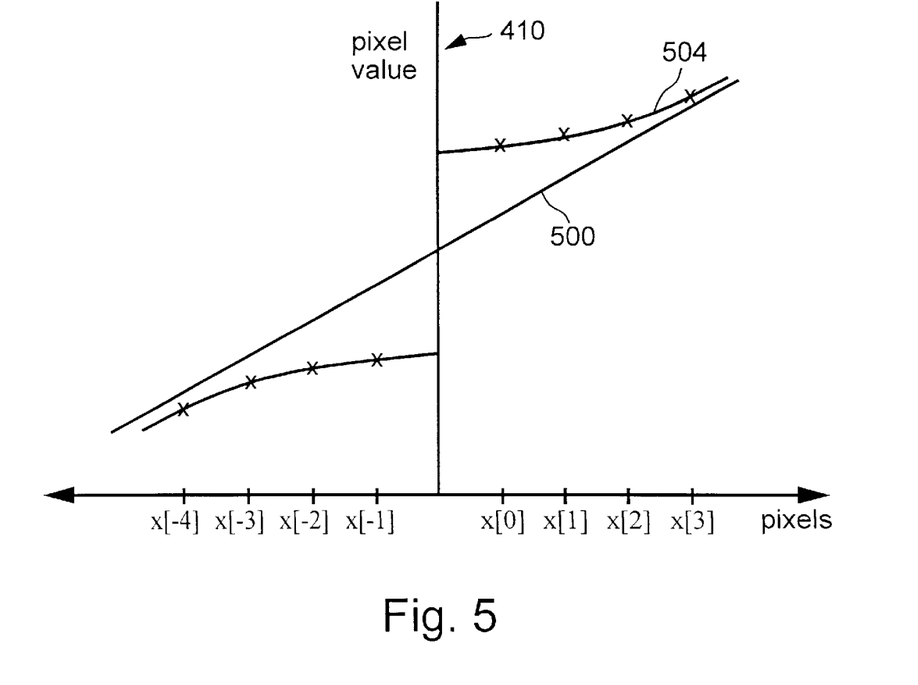
FIG. 5 illustrates an example of a blocking artifact across a boundary of adjacent decompressed image blocks of the type shown in FIG. 4.

FIG. 5 illustrates an example of a blocking artifact across the boundary 410 of adjacent decompressed image blocks of the type shown in FIG. 4. In FIG. 5, the x-axis represents the location of the pixels in rows 408 and 406, whereas the y-axis represents their pixel values. Typically, decompressed image blocks which have undergone compression and decompression at high compression ratios, can result in blocking artifacts across the boundaries of the decompressed image blocks. FIG. 5 shows an example of a one dimensional image signal 500 of constant slope. This image signal 500 is representative of the corresponding original image signal of rows 406,408 of FIG. 4. In this particular example, the adjacent rows (not shown) of FIG. 4 have similar image signals 500 having substantially the same constant slope. These image signals 500 are compressed into at least two blocks, one block 402 coded to the left of the boundary 410 and another block 404 coded to the right of the boundary 410. After decompression, the left and right coded blocks 402 and 404 result in a row of pixels 406,408 having a one dimensional image signal 504. The adjacent rows (not shown) also have one-dimensional image signals substantially similar to the one-dimensional image signal 504. Thus, the sudden jump along the boundary 410 causes the appearance of a false vertical line or edge in the decompressed image, and are the cause of a blocking artifact.

The step of boundary filtering 210 will now be described with reference to FIG. 4 and formulae (1). The step of boundary filtering replaces the values of the pixels x[0],x[1] . . . ,x[m] and x[−n], . . . ,x[−2],x[−1] in accordance with the following formulae (1).

$$x[i]=x[i]-\alpha_i(x[0]-x[-1]) \text{ where } i=0,1,2,3,\ldots,m \quad (1)$$

$$x[-i]=x[-i]+\alpha_{i-1}(x[0]-x[-1]) \text{ where } i=1,2,3,\ldots,n$$

This filtering process is very simple, spatially varying and data independent and gives an extremely effective boundary filter. The boundary filtering step 210 includes the calculation of weighted sums of the difference of the pixel values x[0] and x[−1] and the replacement of the pixel values x[i],x[−i]. This is based on the recognition that the pixel values x[0] and x[−1] are fairly representative of all the pixels in the neighbourhood of the blocking artifact together with the fact that x[0] and x[−1] have not been exploited for their statistical dependency during the compression and decompression process.

The boundary filter process is most effective for reasonably large block sizes, specifically, for block sizes greater than the 8×8 block size of JPEG. In the former case, it has been found that the blocking artifacts are essentially a one dimensional phenomenon. The boundary filtering process in accordance with the invention is one dimensional, in that the filtering process need only occur locally in one dimension across the boundary. Each vertical boundary may be filtered by filtering the rows across the boundary and then filter each horizontal boundary by filtering the columns across the boundary. Preferably, the block size can be 64×64 (rows× columns) of pixels. However, any block size greater than 8×8 pixels is suitable.

Preferably, the filtering process is applied symmetrically and specifically to only 4 pixels on either side of the boundary 410 (i.e. n=m+1=4). The filtering over a small neighbourhood of pixels means less pixels have to be filtered. This reduces the buffering requirements and helps minimize computation and extra memory read/write accesses.

Preferably, the difference x[0]−x[−1] is precalculated and thus only one multiplication and addition is needed for filtering each pixel x[i]. The coefficients $\alpha_0, \alpha_1, \ldots$ may also be chosen to be powers of two (or an integer multiple thereof). In this way, the smoothing in equation (1) can be implemented with an addition and bit shifts. The coefficients can have the following values, in the case of higher compression (for say, a uniform quantisation step size of around 40 or above), $$\alpha_0 = 3/8 \;\; \alpha_1 = 1/4 \;\; \alpha_2 = 1/8 \;\; \alpha_3 = 1/16$$

while for moderate to high compression (for a quantisation step size of say 20–40), the coefficients can have the following values $$\alpha_0 = 1/8 \;\; \alpha_1 = 1/8 \;\; \alpha_2 = 1/16 \;\; \alpha_3 = 0$$

Alternative Embodiment(s)

Figure 3:
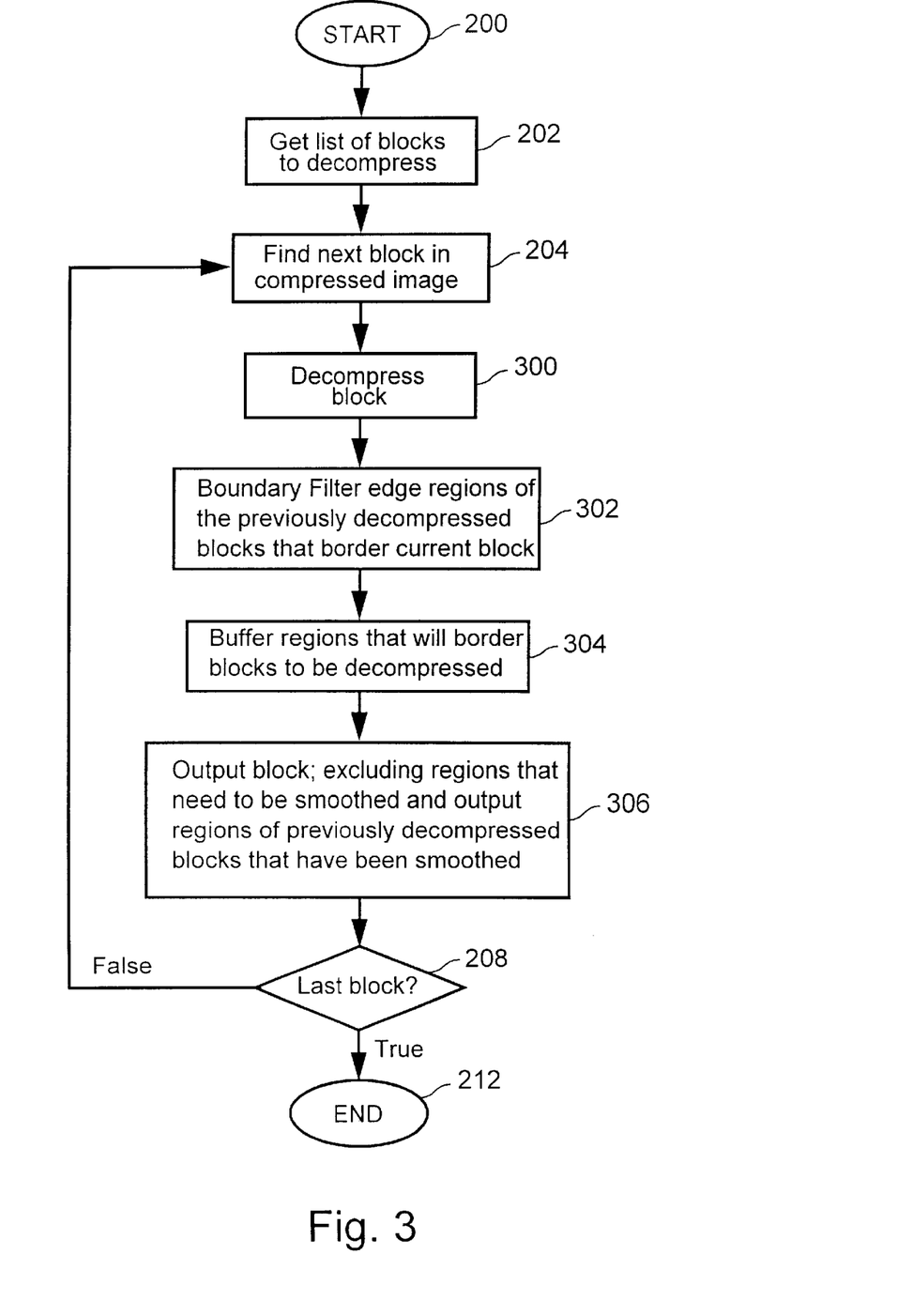
FIG. 3 illustrates a flow diagram of a method of decompressing a compressed digital image in accordance with an alternative embodiment of the invention.

FIG. 3 illustrates a flow diagram of a method of decompressing a compressed digital image in accordance with an alternative embodiment of the invention. The steps 200, 202, 204 208 and 212 are the same as that described with reference to FIG. 2, and thus will not be discussed further. In step 300, the next block in the list is decompressed. In this embodiment, the blocks are processed in raster scan order. Thus the regions neighbouring the left hand edge and top edge of each block have already been decompressed and have been buffered. In the next step 302, the block boundary regions are boundary filtered (including buffered data from adjacent previously decompressed blocks). Namely, the rows are filtered around the left hand edge, and the columns are filtered around the top edge of the block. For more details on the step of boundary filtering reference is made to the section herein entitled "Preferred Embodiment(s) of Boundary Filtering". In the next step 304, the right hand region and bottom region of the current decompressed block is buffered, so that they can be smoothed when the relevant blocks are decompressed later. It is not necessary to smooth or buffer edge regions that are on the border of the image portion to be decoded. For example, with the first block it is not necessary to smooth the left-hand and top edge region, and with the last block it is not necessary to buffer the right-hand and bottom edge regions. In the next step 306, the decompressed filtered block, excluding those regions of the decompressed block that are yet to be filtered is output. Also those regions of previously decoded blocks that have been smoothed are output.

Preferred Embodiment(s) of Apparatus

Figure 6:
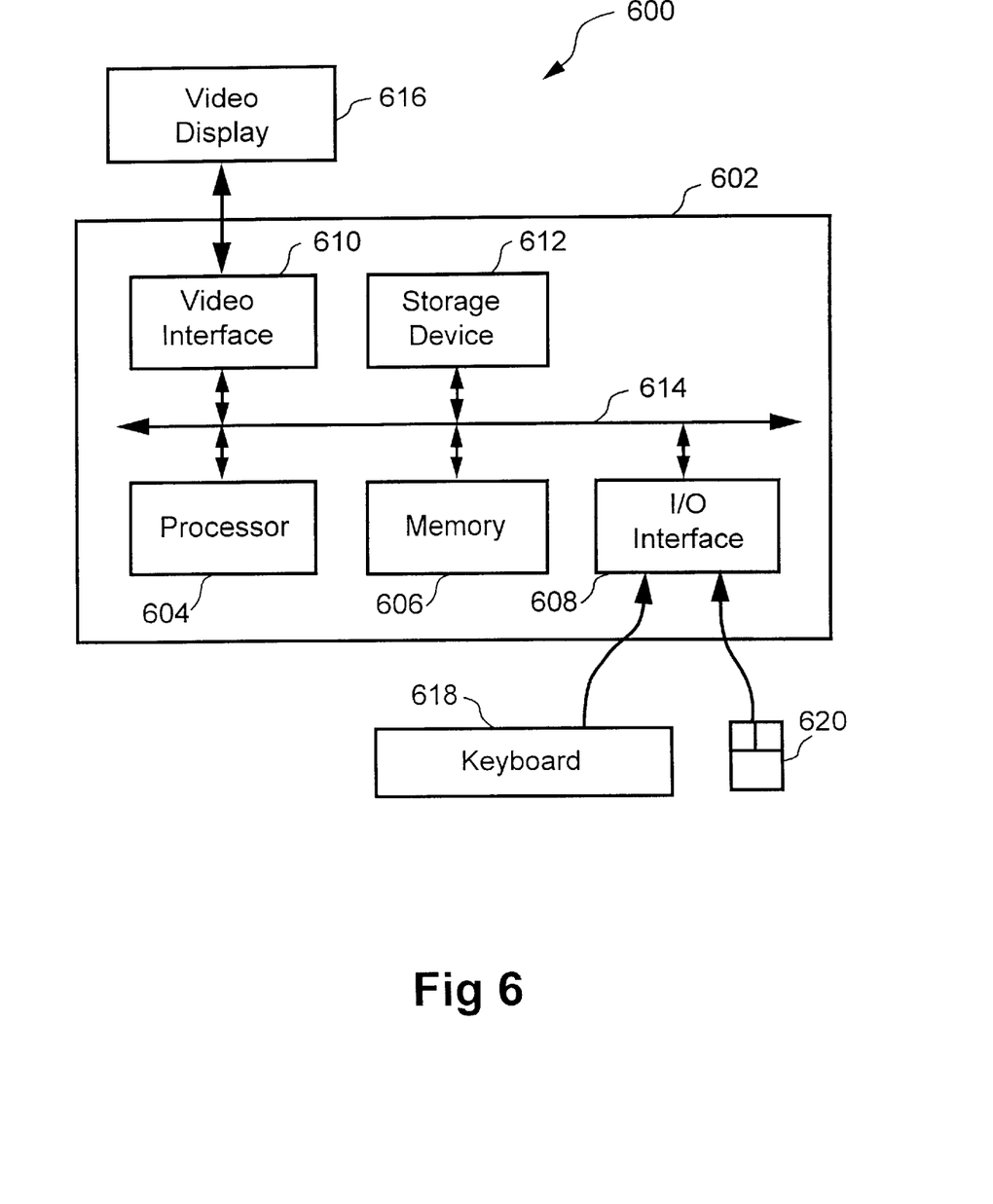
FIG. 6 illustrates in block form a conventional general-purpose computer for implementing the processes of FIGS. 1 to 5.

The processes for boundary filtering are preferably practiced using a conventional general-purpose computer, such as the one shown in FIG. 6, wherein the processes of FIGS. 1 to 5 may be implemented as software executing on the computer. In particular, the steps of the methods are effected by instructions in the software that are carried out by the computer. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for boundary filtering in accordance with the embodiments of the invention.

The computer system 600 includes the computer 602, a video display 616, and input devices 618, 620. In addition, the computer system 600 can have any of a number of other output devices including line printers, laser printers, plotters, and other reproduction devices connected to the computer 602. The computer system 600 can be connected to one or more other computers via a communication interface using an appropriate communication channel such as a modem communications path, a computer network, or the like. The computer network may include a local area network (LAN), a wide area network (WAN), an Intranet, and/or the Internet.

The computer 602 itself includes a central processing unit(s) (simply referred to as a processor hereinafter) 604, a memory 606 which may include random access memory (RAM) and read-only memory (ROM), input/output (IO) interfaces 608, a video interface 610, and one or more storage devices generally represented by a block 612 in FIG. 6. The storage device(s) 612 can include one or more of the following: a floppy disc, a hard disc drive, a magneto-optical disc drive, CD-ROM, magnetic tape or any other of a number of non-volatile storage devices well known to those skilled in the art. Each of the components 604 to 612 is typically connected to one or more of the other devices via a bus 614 that in turn can include data, address, and control buses.

The video interface 610 is connected to the video display 616 and provides video signals from the computer 602 for display on the video display 616. User input to operate the computer 602 can be provided by one or more input devices 608. For example, an operator can use the keyboard 618 and/or a pointing device such as the mouse 620 to provide input to the computer 602.

The system 600 is simply provided for illustrative purposes and other configurations can be employed without departing from the scope and spirit of the invention. Exemplary computers on which the embodiments can be practiced include IBM-PC/ATs or compatibles, one of the Macintosh™ family of PCs, Sun Sparcstation™, or the like. The foregoing is merely exemplary of the types of computers with which the embodiments of the invention may be practiced. Typically, the processes of the embodiments, described hereinafter, are resident as software or a program recorded on a hard disk drive (generally depicted as block 612 in FIG. 6) as the computer readable medium, and read and controlled using the processor 604. Intermediate storage of the program and pixel data and any data fetched from the network may be accomplished using the semiconductor memory 606, possibly in concert with the hard disk drive 612.

In some instances, the program may be supplied to the user encoded on a CD-ROM or a floppy disk (both generally depicted by block 612), or alternatively could be read by the user from the network via a modem device connected to the computer, for example. Still further, the software can also be loaded into the computer system 600 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

Alternatively, the boundary filtering method can be implemented in dedicated hardware such as a digital filter in the form of an integrated circuit.

The foregoing only describes a small number of embodiments of the present invention, however, modifications and/or changes can be made thereto by a person skilled in the art without departing from the scope and spirit of the invention.

I claim:

1. A method of boundary filtering a digital image, wherein the digital image includes a plurality of adjacent decompressed blocks having one or more boundaries therebetween, wherein said blocks have previously been compressed according to a discrete wavelet transform, and wherein said blocks each include a plurality of rows and columns of pixels x[i], and the rows and/or columns of the pixels disposed on opposite sides of the boundaries each include a first line of pixels x[−n], . . . x[−1] and a second line of pixels x[O] . . . x[m] respectively, wherein the pixels x[−1] and x[0] are endpoints of the first and second pixel lines and are adjacently disposed, and wherein the method includes performing the following steps for each of said first and second lines:

(i) determining a plurality of weighted sums of at least the difference between the values of the pixels x[−1] and x[0]; and (ii) replacing, for each pixel x[i], the pixel value of x[i] with the sum of the pixel value of x[i] and a respective said weighted sum, where i=−n, . . . ,m; and wherein m+n is less than the number of rows in the block and/or is less than the number of columns in the block.

2. A method as claimed in claim 1, wherein the determining step includes the substep of determining a plurality of said weighted sums according to the following formulae:

$$\alpha_{i-1}(x[0]-x[-1])$$

where $\alpha_{i-1}$ are weighting coefficients and i=1,2,3, . . . ,n and said replacing step includes the substep of replacing the pixel values x[i] in accordance with the following formulae:

$$x[-i]=x[-i]+\alpha_{i-1}(x[0]-x[-1]) \text{ where } i=1,2,3,\ldots,n.$$

3. A method as claimed in claim 2, wherein the determining step includes the substep of determining a plurality of said weighted sums according to the following formulae:

$$-\alpha_i(x[0]-x[-1])$$

where $\alpha_i$ are weighting coefficients and i=0,1,2,3, . . . ,m and said replacing step includes the substep of replacing the pixel values x[i] in accordance with the following formulae:

$$x[i]=x[i]-\alpha_i(x[0]-x[-1]) \text{ where } i=0,1,2,3,\ldots,m.$$

4. A method as claimed in claim 3, wherein n=m+1.

5. A method as claimed in claim 4, wherein the weighting coefficients are a inverse power of two or a multiple thereof.

6. A method as claimed in claim 4, wherein n=4.

7. A method as claimed in claim 6, wherein the values of the weighting coefficients are:

$$\alpha_0=\tfrac{3}{8},\ \alpha_1=\tfrac{1}{4},\ \alpha_2=\tfrac{1}{8},\ \alpha_3=\tfrac{1}{16}.$$

8. A method as claimed in claim 6, wherein the values of the weighting coefficients are:

$$\alpha_0=\tfrac{1}{8},\ \alpha_1=\tfrac{1}{8},\ \alpha_2=\tfrac{1}{16},\ \alpha_3=0.$$

9. A method as claimed in claim 1, wherein the number of rows and columns in a block is greater than 8×8.

10. A method as claimed in claim 9, wherein the number of rows and columns in a block is 64×64.

11. A method as claimed in claim 1, wherein all the blocks of the digital image are decompressed prior to performing the determining and replacing steps.

12. A method as claimed in claim 1, wherein the said method further includes the steps of:

(a) decompressing the blocks of the digital image in a predetermined scan order; and performing the following steps after the decompression of each block:

(a1) performing said determining step and replacing step on those boundary regions of the previously decompressed blocks that border the current decompressed block;

(a2) storing those pixels of the current decompressed block that border blocks to be decompressed;

(a3) outputting the current decompressed block, excluding those regions of pixels yet to be boundary filtered; and (a4) outputting those regions of pixels of previously decompressed blocks that have been boundary filtered.

13. An apparatus for boundary filtering a digital image, wherein the digital image includes a plurality of adjacent decompressed blocks having one or more boundaries therebetween, wherein said blocks have previously be compressed according to a discrete wavelet transform, and wherein said blocks each include a plurality of rows and columns of pixels x[i], and the rows and/or columns of the pixels disposed on opposite sides of the boundaries each include a first line of pixels x[−n], . . . x[−1] and a second line of pixels x[0, . . . x[m] respectively, wherein the pixels x[−1] and x[0] are endpoints of the first and second pixel lines and are adjacently disposed, and wherein the apparatus includes:

means for determining a plurality of weighted sums of at least the difference between the values of the pixels x[−1] and x[o]; and means for replacing, for each pixel x[i], the pixel value of x[i] with the sum of the pixel value of x[i] and a respective said weighted sum, where i=−n, . . . ,m; and wherein m+n is less than the number of rows in the block and/or is less than the number of columns in the block.

14. An apparatus as claimed in claim 13, wherein the determining means includes means for determining a plurality of said weighted sums according to the following formulae:

$$\alpha_{i-1}(x[0]-x[-1])$$

where $\alpha_{i-1}$ are weighting coefficients and i=1,2,3, . . . ,n and said replacing means includes means for replacing the pixel values x[i] in accordance with the following formulae:

$$x[-i]=x[-i]+\alpha_{i-1}(x[0]-x[-1]) \text{ where } i=1,2,3,\ldots,n.$$

15. An apparatus as claimed in claim 14, wherein the determining means includes means for determining a plurality of said weighted sums according to the following formulae:

$$-\alpha_i(x[0]-x[-1])$$

where $\alpha_i$ are weighting coefficients and i=0,1,2,3, . . . ,m and said replacing means includes means for replacing the pixel values x[i] in accordance with the following formulae $$x[i]=x[i]-\alpha_i(x[0]-x[-1]) \text{ where } i=0,1,2,3,\ldots,m.$$

16. An apparatus as claimed in claim 15, wherein n=m+1.
17. An apparatus as claimed in claim 16, wherein the weighting coefficients are a inverse power of two or a multiple thereof.
18. An apparatus as claimed in claim 16, wherein n=4.
19. An apparatus as claimed in claim 18, wherein the values of the weighting coefficients are:

$$\alpha_0=3/8,\ \alpha_1=1/4,\ \alpha_2=1/8,\ \alpha_3=1/16.$$

20. An apparatus as claimed in claim 18, wherein the values of the weighting coefficients are:

$$\alpha_0=1/8,\ \alpha_1=1/8,\ \alpha_2=1/16,\ \alpha_3=0.$$

21. An apparatus as claimed in claim 13, wherein the number of rows and columns in a block is greater than 8×8.
22. An apparatus as claimed in claim 21, wherein the number of rows and columns in a block is 64×64.
23. An apparatus as claimed in claim 13, wherein the apparatus includes means for decompressing all the blocks of the digital image prior to supply to the determining and replacing means.
24. An apparatus as claimed in claim 13, wherein the said apparatus further includes:
  means for decompressing the blocks of the digital image in a predetermined scan order;
  means for operating said determining means and replacing means on those boundaries regions of the previously decompressed blocks that border the current decompressed block;
  means for storing those pixels of the current decompressed block that border blocks to be decompressed;
  means for outputting the current decompressed block, excluding those regions of pixels yet to be boundary filtered; and
  means for outputting those regions of pixels of previously decompressed blocks that have been boundary filtered.
25. A computer program product including a computer readable medium having recorded thereon a computer program for boundary filtering a digital image, wherein the digital image includes a plurality of adjacent decompressed blocks having one or more boundaries therebetween, wherein said blocks have previously been compressed according to a discrete wavelet transform, and wherein said blocks each include a plurality of rows and columns of pixels x[i], and the rows and/or columns of the pixels disposed on opposite sides of the boundaries each include a first line of pixels x[-n], . . . x[-1] and a second line of pixels x[0] . . . x[m] respectively, wherein the pixels x[-1] and x[0] are endpoints of the first and second pixel lines and are adjacently disposed, said computer program product including:
  means for determining a plurality of weighted sums of at least the difference between the values of the pixels x[-1] and x[0]; and
  means for replacing, for each pixel x[i], the pixel value of x[i] with the sum of the pixel value of x[i] and a respective said weighted sum, where i=-n, . . . ,m; and
  wherein m+n is less than the number of rows in the block and/or is less than the number of columns in the block.
26. A computer program product as claimed in claim 25, wherein the determining means includes means for determining a plurality of said weighted sums according to the following formulae:

$$\alpha_{i-1}(x[0]-x[-1])$$

where $\alpha_{i-1}$ are weighting coefficients and i=1,2,3, . . . ,n and said replacing means includes means for replacing the pixel values x[i] in accordance with the following formulae:

$$x[-i]=x[-i]+\alpha_{i-1}(x[0]-x[-1])$$

where i=1,2,3, . . . ,n.
27. A computer program product as claimed in claim 26, wherein the determining means includes means for determining a plurality of said weighted sums according to the following formulae:

$$-\alpha_{i-1}(x[0]-x[-1])$$

where $\alpha_i$ are weighting coefficients and i=0,1,2,3, . . . ,m and said replacing means includes means for replacing the pixel values x[i] in accordance with the following formulae $$x[i]=x[i]-\alpha_i(x[0]-x[-1]) \text{ where } i=0,1,2,3,\ldots,m.$$

28. A computer program product as claimed in claim 27, wherein n=m+1.
29. A computer program product as claimed in claim 28, wherein the weighting coefficients are a inverse power of two or a multiple thereof.
30. A computer program product as claimed in claim 28, wherein n=4.
31. A computer program product as claimed in claim 30, wherein the values of the weighting coefficients are:

$$\alpha_0=3/8,\ \alpha_1=1/4,\ \alpha_2=1/8,\ \alpha_3=1/16.$$

32. A computer program product as claimed in claim 30, wherein the values of the weighting coefficients are:

$$\alpha_0=1/8,\ \alpha_1=1/8,\ \alpha_2=1/16,\ \alpha_3=0.$$

33. A computer program product as claimed in claim 25 wherein the number of rows and columns in a block is greater than 8×8.
34. A computer program product as claimed in claim 33, wherein the number of rows and columns in a block is 64×64.
35. A computer program product as claimed in claim 25, wherein the computer program product includes means for decompressing all the blocks of the digital image prior to supply to the determining and replacing means.

36. A computer program product as claimed in claim 25, wherein the said computer program product further includes:

means for decompressing the blocks of the digital image in a predetermined scan order;

means for operating said determining means and replacing means on those boundaries regions of the previously decompressed blocks that border the current decompressed block;

means for storing those pixels of the current decompressed block that border blocks to be decompressed;

means for outputting the current decompressed block, excluding those regions of pixels yet to be boundary filtered; and means for outputting those regions of pixels of previously decompressed blocks that have been boundary filtered.

37. A method of decompressing a digital image, wherein the digital image comprises a plurality of compressed blocks, wherein said compressed blocks are based on a discrete wavelet transform, said method comprises the following steps:

(a) decompressing a compressed block of the digital image;

(b) one dimensional filtering those boundary regions of any previously decompressed blocks and the current decompressed block which have a common boundary in accordance with the formulae:

$$x[i]=x[i]-\alpha_i(X[0]-X[-1]) \text{ where } i=0,1,2,3,\ldots,m$$

$$x[-i]=x[-i]-\alpha_{i-1}(X[0]-X[-1]) \text{ where } i=0,1,2,3,\ldots,n$$

and where $\alpha_i$ and $\alpha_{i-1}$ are weighted coefficients, wherein the one-dimensional filtering is applied perpendicular to the boundary to at least a first line of pixels $x[-n], \ldots, x[-1]$ and a second line of pixels $x[0] \ldots x[m]$ respectively on opposite sides of the boundary;

(c) storing those pixels of the current decompressed block that border blocks to be decompressed;

(d) outputting the current decompressed block, excluding those regions of pixels yet to be filtered;

(e) outputting those regions of pixels of previously decompressed blocks that have been filtered; and (f) repeating steps (a) to (e) for each subsequent block in a predetermined scan order.

38. A filtering apparatus for modifying a boundary portion between blocks on a reproduction image obtained by irreversible compressing and decompressing an image by every block, said filtering apparatus comprising:

input means for inputting the reproduction image; and transforming means for transforming a current pixel by adding or subtracting a weighted sum of differences between pixels adjacent to a boundary portion of a predetermined block with respect to the current pixel on the reproduction image.

39. A filtering method for modifying a boundary portion between blocks on a reproduction image obtained by irreversible compressing and decompressing an image by every block, said method comprising the steps of:

inputting the reproduction image; and transforming a current pixel by adding or subtracting a weighted sum of differences between pixels adjacent to a boundary portion of a predetermined block with respect to the current pixel on the reproduction image.

40. A computer program product including a computer readable medium storing a filtering method for modifying a boundary portion between blocks on a reproduction image obtained by irreversible compressing and decompressing an image by every block, said method comprising the steps of:

inputting the reproduction image; and transforming a current pixel by adding or subtracting a weighted sum of differences between pixels adjacent to a boundary portion of a predetermined block with respect to the current pixel on the reproduction image.

* * * * *

UNITED STATES PATENT AND TRADEMARK OFFICE
CERTIFICATE OF CORRECTION

PATENT NO. : 6,563,958 B1  Page 1 of 1
DATED : May 13, 2003
INVENTOR(S) : James Philip Andrew It is certified that error appears in the above-identified patent and that said Letters Patent is hereby corrected as shown below:

Column 5,
Line 33, "$\alpha_0=1/8\ \alpha_1 1/8\ \alpha_2=1/16\ \alpha_3=0$" should read -- $\alpha_0=1/8\ \alpha_1=1/8\ \alpha_2=1/16\ \alpha_3=0$ --.
Line 39, "204 208" should read -- 204, 208 --.

Column 7,
Line 28, "pixels x[i)," should read -- pixels x[i], --.
Line 31, "pixels x[O]" should read -- pixels x[0] --.

Column 8,
Line 3, "a inverse" should read -- an inverse --.
Line 41, "be compressed" should read -- been compressed--.
Line 47, "pixels x[0," should read -- pixels x[0], --.
Line 54, "x[o]:" should read -- x[0]: --.

Column 9,
Line 16, "formulae" should read -- formulae: --.
Line 21, "a inverse" should read -- an inverse --.

Column 10,
Line 26, "x[-i]x[-i]+$\alpha_{i-1}$(x[0]-x[-1])" should read -- x[-i]=x[-i]+$\alpha_{i-1}$(x[0]-x[-1]) --.
Line 34, "-$\alpha_{i-1}$(x[0]-x[-1])" should read -- -$\alpha_i$(x[0]-x[-1]) --.
Line 39, "formulae" should read -- formulae: --.
Line 45, "a inverse" should read -- an inverse --.

Signed and Sealed this

Ninth Day of March, 2004

JON W. DUDAS
*Acting Director of the United States Patent and Trademark Office*